No. 765,340. PATENTED JULY 19, 1904.
G. IMBERT.
GAS BURNER.
APPLICATION FILED DEC. 19, 1902.
NO MODEL.

Witnesses:
Waldo M. Chapin
Randall A. Trumpy.

Inventor
Georges Imbert
by Wm. Rosenbaum
atty.

No. 765,340.

Patented July 19, 1904.

UNITED STATES PATENT OFFICE.

GEORGES IMBERT, OF BRUSSELS, BELGIUM.

GAS-BURNER.

SPECIFICATION forming part of Letters Patent No. 765,340, dated July 19, 1904.

Application filed December 19, 1902. Serial No. 135,875. (No model.)

*To all whom it may concern:*

Be it known that I, GEORGES IMBERT, engineer, a citizen of the Republic of France, residing at Brussels, in the Kingdom of Belgium, have invented certain new and useful Improvements in Gas-Burners, of which the following is a specification.

This invention relates to gas-burners, and has for its purpose to secure a mixing-chamber for air and gas adapted to be used in combination with gas-burners for heating and lighting purposes in order to increase the efficiency and to reduce the consumption of gas.

According to my invention a mixture of air and gas combined in the requisite theoretical proportions is rendered perfect by means of one or more mixers, such as helices or fans, adapted to be rotated in opposite directions under the action of the pressure of the mixture of gas and air and arranged in a mixing-chamber in close proximity with the upper part or head of said chamber used as a "burner," properly so called, the said mixing-chamber being provided with one or more perforated plates or wire-gauze adapted to allow of the atomization of the mixture before its ignition and to prevent any firing back of the flame.

Figure 1:
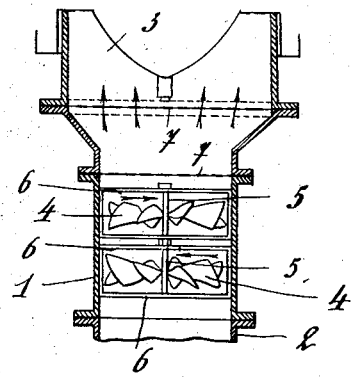
Figure 2:
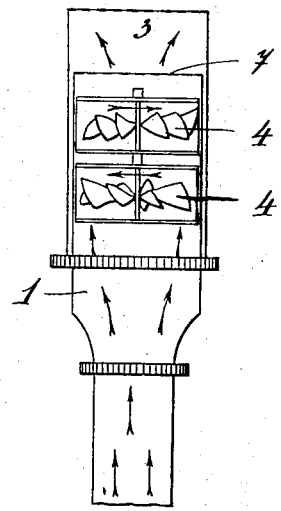

Referring to the annexed drawings, which show two forms of construction of a gas-burner according to the invention, Figure 1 is a sectional elevation of a burner specially adapted for heating purposes. Fig. 2 is a similar view of a burner specially adapted for lighting purposes.

A burner constructed according to my invention consists, essentially, of a tube 1, adapted to be placed or fixed on a pipe 2, provided with gas and air inlets, as is usually the case in Bunsen burners. The mixture of air and gas entering into the chamber or tube 1 is rendered perfect by means of helices 4, suitably mounted on pivot-pins 5, rotating in supports 6. The said helices are set in motion under the action of the current of gas and air and are rotated in opposite directions. Immediately above the said helices or mixers are placed in the mixing-chamber 1 one or more wire-gauze or perforated plates 5, through which the mixture of gas and air is forced before reaching the head 3 of the burner, where it is ignited.

I am aware that a helix or fan of similar construction has already been used in gas-burners; but it has not, so far as I know, been combined, as herein described, with a special mixing-chamber adapted to be placed on the ordinary mixing-pipe of a burner and in close proximity with the head of the burner, which is an essential feature of my invention, as air and gas being two fluids of different densities their mixture can only be suitably utilized if it is effected at or as near as possible to the place of combustion in order to prevent the dissociation of the mixture before reaching the point of combustion.

What I claim is—

The combination with the mixture-pipe of a burner, of a tube removably secured on said pipe, a head for said tube, three supports placed across said tube, two pivot-pins rotating between said supports, two helices adapted to rotate with said pivot-pins in opposite directions in said tube in close proximity to the head so as to mix a current of gas and air passing through said tube and to prevent the dissociation of the mixture before reaching the head and perforated plates placed in the tube between the helices and the head, substantially as described.

In witness whereof I have hereunto set my hand in presence of two witnesses.

GEORGES IMBERT.

Witnesses:
 GEORGE BERLE,
 GREGORY PHELAN.